Figures 1, 2:
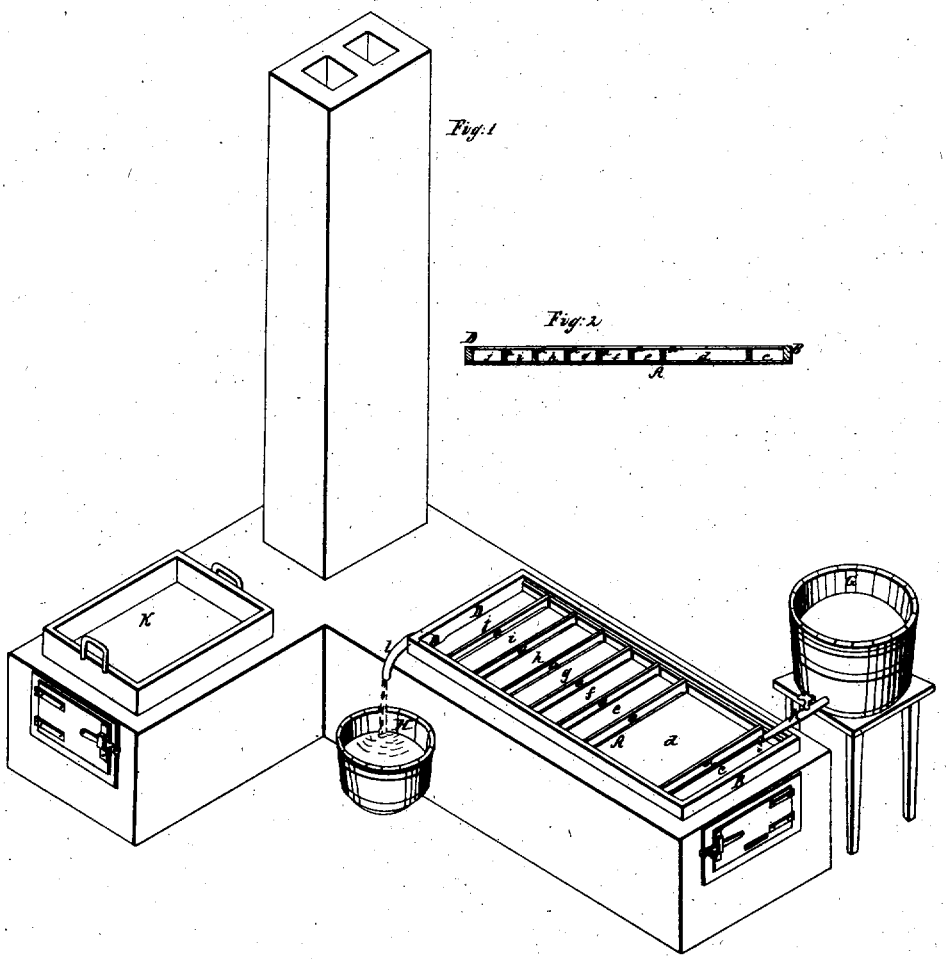

C. Jacobs.

Evaporating Pan.

No. 1,418. Patented Feb. 24, 1863.

Witnesses
Rufus Wheaton
A. C. Lawrence

Inventor
Cornelius Jacobs
By his Attys
Mason, Fenwick & Lawrence

UNITED STATES PATENT OFFICE.

CORNELIUS JACOBS, OF COLUMBUS, OHIO.

IMPROVEMENT IN PANS FOR EVAPORATING AND CLARIFYING SACCHARINE JUICES.

Specification forming part of Letters Patent No. 32,998, dated August 6, 1861; Reissue No. 1,418, dated February 21, 1863.

*To all whom it may concern:*

Be it known that I, CORNELIUS JACOBS, of the city of Columbus, county of Franklin, and State of Ohio, have invented certain new and useful Improvements in Evaporating and Clarifying Pans; and I do hereby declare that the following is a full, clear, and exact description of the same, reference being had to the accompanying drawings, forming part of this specification, in which—

Figure 1 is a perspective view of my improved pan arranged for use on a furnace. Fig. 2 is a vertical longitudinal section of the same detached from the furnace.

The same letters of reference in the two figures indicate corresponding parts.

My pan is especially designed for clarifying and condensing the expressed juices of *Sorghum saccharatum* and other kindred plants for the purpose of preparing the same to be granulated into sugar, or for the manufacture of sirup or molasses therefrom.

The nature of my invention consists, first, in a pan in which the juices can be cooked in a broad, thin sheet unbroken in its direct course, and in apartments which are separated above the surface of the sheet, but are allowed to communicate in a direct manner below the surface of the sheet of juice; second, in fitting the partitions of the pan so that they may be adjusted to the varying thickness of the broad undisturbed sheet of juice, and also that they may be removed for the purpose of cleaning away sedimentary accumulations; third, in tapering or rounding the lower edges of the division-partitions, so that when they are set to rest down upon the bottom of the pan a very small amount of surface for juice to hang upon shall exist, and thus scorching of the juice from momentary delay in its passage under the strips shall be obviated; fourth, in the combination, with an evaporating-pan, of an adjustable discharging-tube for the purpose of regulating the depth of the juice in the pan during the evaporating process.

To enable others skilled in the art to make and use my invention, I will proceed to describe the same with reference to the drawings.

The bottom A of the pan is made of metal, while its sides and ends B C D E are of wood or any other suitable material. The bottom is level or horizontal and the sides and ends upright. This pan is divided into chambers *c d e f g h i j* by means of transverse partitions *a a a a a a a*, extending from one side of the pan to the other and fitting in grooves, so as to be readily adjusted or removed as occasion may require. These partitions may be set so as to rest upon the bottom of the pan or slightly out of contact with the bottom. The idea of their use is to secure the flow of a broad, thin sheet of juice in a direct course under their edge when the juice is under hydrostatic pressure; and it is this result that I desire to be protected in, whether the partitions are in contact with or out of contact with the surface of the pan-bottom, and whether the partitions are set permanently on the pan or so as to be adjusted. I would here state that in my first experiments I found that in the evaporation of the juice on the least possible depth in the pan I could obtain the clearest and the best quality of sirup. In these experiments I adopted, for the purpose of regulating my partitions or scum restricters and confiners, the grooves in the sides of the pan, so that I could slide them up or down agreeably to the depth of the juice, the frictional contact retaining the partitions in place. I afterward discovered that the partitions could be set in contact with the pan-bottom, and by tapering the lower edge of the partitions the filling up between them and the bottom of the pan of the capillary passages by the coarse vegetable substances intermixed with the expressed juices, and also the burning of the juice, would be prevented.

In the drawings I have shown the partitions beveled on their lower edge when resting down upon the bottom of the pan. I also have shown them beveled or tapered off in another view when not resting down upon the bottom of the pan. It is obvious, however, that the first part of my invention may be performed without resorting to this bevel, provided it is not desired to cook the juice on an extremely shallow depth. When the first plan—viz., having the partitions rest upon the bottom—is adopted, I depend upon the hydrostatic pressure and capillary attraction; but when the latter plan—viz., having the partitions out of contact with the bottom of the pan—I depend only upon hydrostatic pressure of the juice.

By means of the partitions with passage under them for a broad, thin sheet of juice, the juice is distributed over the whole bottom of the pan, and equally acted upon by the heat, and thus an equal and regular flow is maintained and a uniform evaporation effected, and while this is so, the free intermixture of the juices (under violent ebullition) in the divisions or chambers is prevented, and therefore an arrest of the impurities rising upon the surface of the juice is effected in each of the respective divisions, and skimming can be performed in either of the divisions without disturbing the juice in the adjoining divisions.

The several divisions formed by the partitions, and marked, respectively, *c d e f g h i j*, should be made of equal capacity, excepting division *d*, so that one skimmer of given size will answer for all, and, when brought into operation, will remove the whole scum in each respective division at once. As the division *d* is subjected to the most direct action of the fire, and in it the greatest scum rises upon the surface of the juice, it should be about three times the size of the other divisions.

I will here remark that the numbers of the divisions and their respective size will depend upon the wants of the operator, and therefore my patent is not restricted in these respects.

In practice the pan rests upon a brick, stone, or metal furnace of any desired construction, as represented, its sides and ends resting on the walls of the furnace horizontally, both in a longitudinal and transverse direction, in order that an extensive shallow condition of the juice may be maintained—that is, an equable shallowness over the whole pan-bottom.

A receiving-vessel, G, for the expressed juices supplies the pan through a regulating-cock, *k*, with the requisite quantity of juice, and the clarified juices escape into a vessel, H, through a bent tube, *l*, at the last end of the pan. The fixed end of the pipe or tube where it joins or enters the pan is round, and connected, so as to turn when force is applied to the loose end of the pipe. The orifice of the attaching end of the pipe comes on a level, or nearly so, with the surface of the pan-bottom; but the loose end may be turned up or down, so as to maintain any desired depth of juice, or to allow the whole flow off into the receiver. By means of this pipe the depth of the juice during the evaporating process may be accurately regulated—that is, any desirable depth may be maintained by raising the loose end of the pipe, or the most practicable shallowness resorted to by lowering said end of the pipe. The flow of the juice over the horizontal bottom of the pan from the division *c* to the discharging-pipe *l* is effected by the fluid gravity, or by a combination of the same and capillary attraction, accordingly as the partitions are set with respect to the bottom of the pan.

The supply of the juices to the division *c* of the pan is to be so regulated by the cock *k* as to compensate for the quantity that is exhausted by evaporation and skimming and the discharge of the clarified sirup through the conductor *l* will require. The juice in division *c* will be heated to nearly the boiling-point before it enters *d*. In entering division *d* it will instantly boil, and throw up the greatest quantity of scum in said division. It will then be gradually clarified and condensed in the other division until it arrives in division *j*, from which a clear sirup is discharged through the pipe *l* into the receiver H. Care sufficient to prevent the bottom of the pan from getting dry or uncovered, and the juice consequently being scorched, is all that is necessary in operating with the pipe *l*, and as this pipe is a very important improvement in shallow evaporating-pans, it admitting of the juice being cooked at an average depth of one-sixteenth of an inch, or less, with safety, and thus saving much time and labor, I do not wish to be limited in its use to a pan constructed as described, although in combination with this pan it is very useful and important, for if the time necessary to expose the juice in the pan to boiling-heat increases in proportion as the depth of the juice in the pan increases, then the time required for a shallow sheet to be clarified and condensed will not be as long as for a deep sheet or body.

In beginning the evaporating operation with this pan, water may be put in sufficient to cover its bottom. When the water begins to boil, the cock *k* is opened and juice supplied, as described, the water running off through pipe *l* as the juice flows to the rear end of the pan.

The sirup, in passing through this pan, as described, may be reduced to any degree of density required; but, after the clarifying is perfected, I prefer to use a deeper pan, K, for further rapid evaporation and condensation, on account of an inclination of the sirup to swell and rise when it has become quite dense.

My invention may be summed up as follows: It admits of a constant supply of sugar-fluid or cane-juice, in a broad, thin sheet or current of the width of the pan-bottom, over the whole surface of the pan at one and the same time, it evaporates this sheet of juice in distinct apartments; it keeps back the scum and feculence; it allows the clear fluid to pass forward from apartment to apartment at a point below the surface of the sheet; it does not allow the feculent matter of one chamber or apartment to mix with that of another during the evaporating process; there are no gates or openings above the surface of the current in any of the partitions to allow scum and impurities to be carried forward with the current; there is no concretion of feculence upon inclined sides; there are no gaps, slides, strainers, or other fixtures to prevent the removal with facility of any scum or impurities that arise in the respective chambers from time to time; and, finally, it permits, as above stated, the fluid to pass forward evenly, equably, and simultaneously from one chamber to another until the last is reached, where it is discharged thoroughly cleansed and reduced to any desired degree of consistency.

What I claim as my invention, and desire to secure by Letters Patent, is—

1. An evaporating-pan with transverse partitions, operating substantially as described.

2. Making the partitions adjustable, substantially as and for the purpose described.

3. The specified construction of the lower edge of the partitions, for the purpose set forth.

4. The adjustable sirup-discharger, in combination with an evaporating-pan, substantially as set forth.

C. JACOBS.

Witnesses:
J. KRONEABITTER,
J. P. REMMY.